United States Patent
Ottestad (10) Patent No.: US 6,649,047 B1
(45) Date of Patent: Nov. 18, 2003

(54) PROTECTION SYSTEM TO PREVENT DAMAGE TO A GAS DIFFUSION MEMBRANE

(75) Inventor: Nils T. Ottestad, Tønsberg (NO)

(73) Assignee: K.V. Aerner Process Systems AS, Lysaker (NO)

( * ) Notice: Subject to any disclaimer, the term of this patent is extended or adjusted under 35 U.S.C. 154(b) by 0 days.

(21) Appl. No.: 10/049,796

(22) PCT Filed: Aug. 12, 1999

(86) PCT No.: PCT/NO99/00254

§ 371 (c)(1),
(2), (4) Date: May 2, 2002

(87) PCT Pub. No.: WO01/12305

PCT Pub. Date: Feb. 22, 2001

(51) Int. Cl.[7] ............................ B01D 53/22; B01D 65/00
(52) U.S. Cl. ......................... 210/90; 210/104; 210/110; 210/120; 210/128; 210/134; 210/137; 210/321.72; 96/4; 96/397; 96/400; 96/421
(58) Field of Search ...................... 210/90, 97, 104, 210/110, 120, 128, 123, 129, 134, 137, 257.2, 321.6–321.9; 96/4, 290, 397, 400, 406, 421; 95/45, 51, 214, 235, 236, 19

(56) References Cited

U.S. PATENT DOCUMENTS 5,476,592 A 12/1995 Simard
5,669,959 A * 9/1997 Doshi et al.

FOREIGN PATENT DOCUMENTS

NO 19980642 8/1999
WO WO 98/51399 11/1998

* cited by examiner

Primary Examiner—Terry K. Cecil
(74) Attorney, Agent, or Firm—Jenkens & Gilchrist, P.C.

(57) ABSTRACT

A protection system arranged to prevent a large trans-membrane pressure difference over a pressure sensitive membrane (4) fitted in a pressure resistant chamber (3), wherein the membrane forms a physical barrier between a liquid and a gas mixture carried through the chamber (3), the protection system includes two shut-off valves (9, 10) provided in the liquid inlet and outlet lines respectively, a buffer tank (3) provided in the line between one of the shut-off valves (9, 10) and the pressure resistant chamber (3), a pressure equalizing valve (12) provided between the gas inlet line (8) and the buffer tank (2) and a pressure sensing valve (14) for measuring the pressure difference over the membrane (4) and which activates the shut-off valves (9, 10) once this pressure difference exceeds a predetermined value.

4 Claims, 7 Drawing Sheets

PROTECTION SYSTEM TO PREVENT DAMAGE TO A GAS DIFFUSION MEMBRANE

FIELD OF THE INVENTION

The present invention relates to a protection system arranged to prevent a large trans-membrane pressure difference over a pressure sensitive membrane (4) fitted in a pressure resistant chamber, where it forms a physical barrier between a liquid and a gas mixture carried through the chamber.

BACKGROUND OF THE INVENTION

The present invention has been developed specifically for the protection of membranes used for natural gas sweetening (mainly $CO_2$ removal, but also for the removal of $H_2S$ and other sour gas components) and for natural gas dehydration ($H_2O$ removal). Such membranes are generally formed as cylindrical tubes. The gas is normally directed along the exterior face of the membrane, and sour gas components diffuses through the membrane, being absorbed by the liquid (usually amine) flowing axially through the interior of the membrane. The ability of the liquid to absorb the sour gas components increases greatly with increasing pressure. Continuous removal of sour gas components is effected by reducing the pressure of the liquid after passage through the membranes, in order to release the sour gas components to the surrounding atmosphere. The pressure of the natural gas is typically of the order 30–100 bar. As the membranes are easily damaged even by moderate trans-membrane pressure differences, it must be possible to control the pressure of the liquid very closely. Membranes used for this purpose may be damaged even at pressure differences at low as +/− 1 bar.

Conventionally, the method employed to secure against harmful pressure differences includes providing a buffer tank, in which the liquid and the natural gas is in open contact. The variations in pressure are thus taken up by liquid flowing into or out of the buffer tank. This conventional system will require a buffer tank of relatively large volume and weight, due to being designed for high pressure. The response time by shut-off due to excessive increase of pressure difference is relatively long. The pressure difference over the membrane may then at all times be kept low, by installing a simple control device to ensure reduced output from the pump upon an increase in buffer tank liquid level, and vice versa.

SUMMARY OF THE INVENTION

The objective of the present invention is to provide a protection system that is capable of protecting the membranes against harmful pressure effects. Furthermore, it is an objective of the present invention to provide a protection system that seeks to put the plant back into normal operation as soon as conditions permit this.

This and other objectives that will become clear from the description of preferred embodiments of the invention.

These objectives are achieved by a protection system arranged to prevent a large trans-membrane pressure difference over a pressure sensitive membrane fitted in a pressure resistant chamber, where the membrane forms a physical barrier between a liquid and a gas mixture carried through the chamber, which is characterised in that the protection system comprises two shut-off valves provided in the liquid inlet and outlets lines respectively, a buffer tank provided in the line between one of the shut-off valves and the pressure resistant chamber, a pressure equalising valve provided between the gas inlet line and the buffer tank and a pressure sensing valve for measuring the pressure difference over the membrane and which activates the shut-off valves once this pressure difference exceed a predetermined value.

The cross section of the valve seats of the shut-off valves is 2 to 5 times larger than the effective flow area, to give the valve body a short travel distance from the open to the shut position.

The buffer tank is arranged to maintain a stable liquid level and the buffer tank comprise a floating body that co-operates with a valve arrangement which, when the liquid level in the buffer tank is too low, opens a channel for venting of gas from the buffer tank, and also opens to a channel for topping up to the liquid buffer volume, and which, when the liquid level is high, opens a channel for dumping of liquid to a reservoir at a lower pressure.

The shut-off valves have a typical response time from fully open to fully closed position of less than 1 second.

The invention will be described in more detail in the following with reference to the accompanying drawings.

DETAILED DESCRIPTION OF THE DRAWINGS

Figure 1:
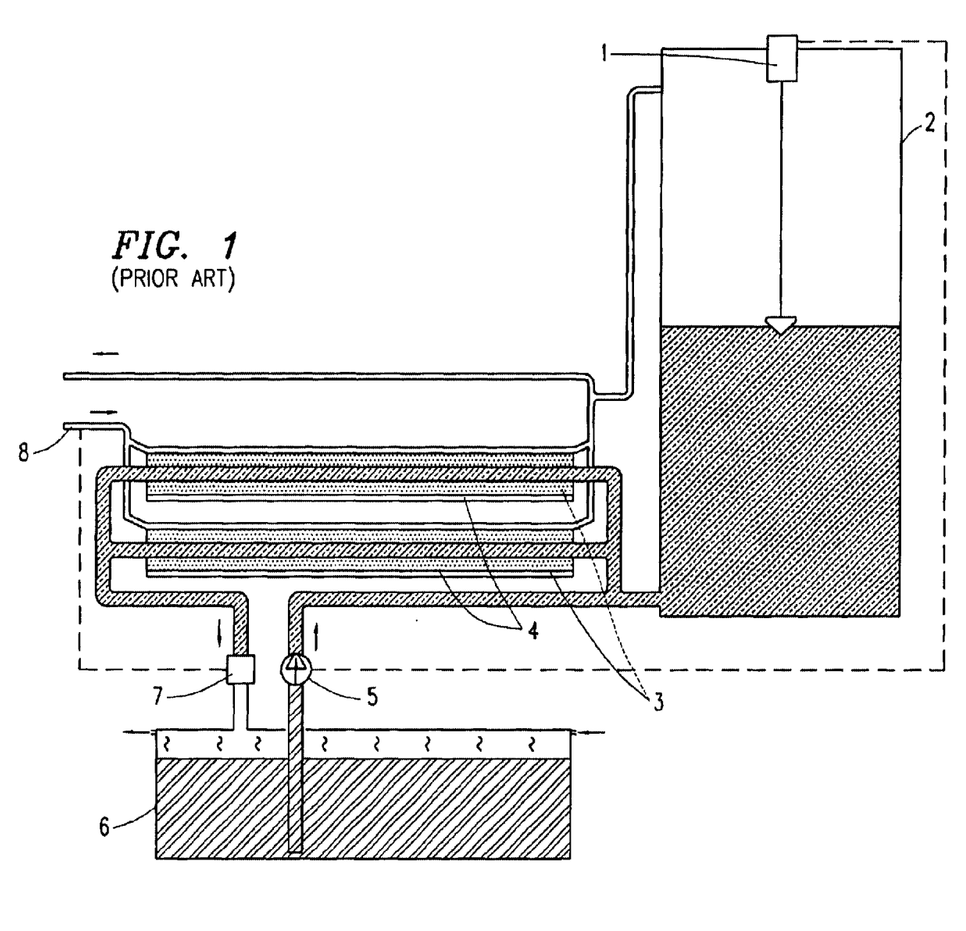
FIG. 1 is a schematical view of a trans-membrane pressure regulator for a membrane contactor according to prior art.

A membrane contactor system for natural gas treatment typically comprises a plurality of membranes. FIG. 1 illustrates the principle of such a system according to prior art. The liquid is circulated through its circuit by a pump 5. The pressure of the liquid is controlled by a back pressure control valve 7 to be approximately identical to the pressure of the natural gas. The carbon dioxide absorbed by the liquid whilst flowing through the membrane 4 is released upon the liquid flowing through the back pressure control valve 7. The natural gas is led into the pipe 8, and is distributed to the respective membrane housings 3. The pipe has an open connection to the top part of the buffer tank 2. The pressure difference between gas and liquid is thereby determined by the liquid level in the buffer tank. The liquid level is kept at a steady level by the level controller 1 reducing the output from the pump when the desired level has been reached. This connection is indicated by a dotted line between the pump 5 and the level controller 1. The release of the carbon dioxide from the liquid may take place from the reservoir 6, where the liquid is at a low pressure. The pipes that lead the natural gas through the treatment plant have been fitted with shut-off valves both before and after the treatment plant (not shown). These will be closed automatically upon any fault occurring in the plant. Shut-off valves exist that can be activated by the use of explosive charges, and which therefore may be closed in a very short time. However, the operation required to re-open these valves is relatively extensive. Other commercially available shut-off valves suitable for this purpose require a relatively long closing time. The height of the buffer tank is typically 6–8 meters, in order to reduce the risk of pressure differences that may harm the membranes. In addition, it is extremely heavy, due to being sized for high pressure.

Thus, the disadvantage of this method is that the process plant becomes undesirably large, heavy and costly. The problem with reducing the size of the buffer tank is that it will require a quick-acting method for protecting the very expensive membranes against harmful pressure effects. A small buffer volume will allow harmful pressure effects to occur very quickly in case of failure of the pump or the pressure control system.

The protection system according to the present invention will now be described in detail with reference to FIGS. 2 to 6B.

Figure 2:
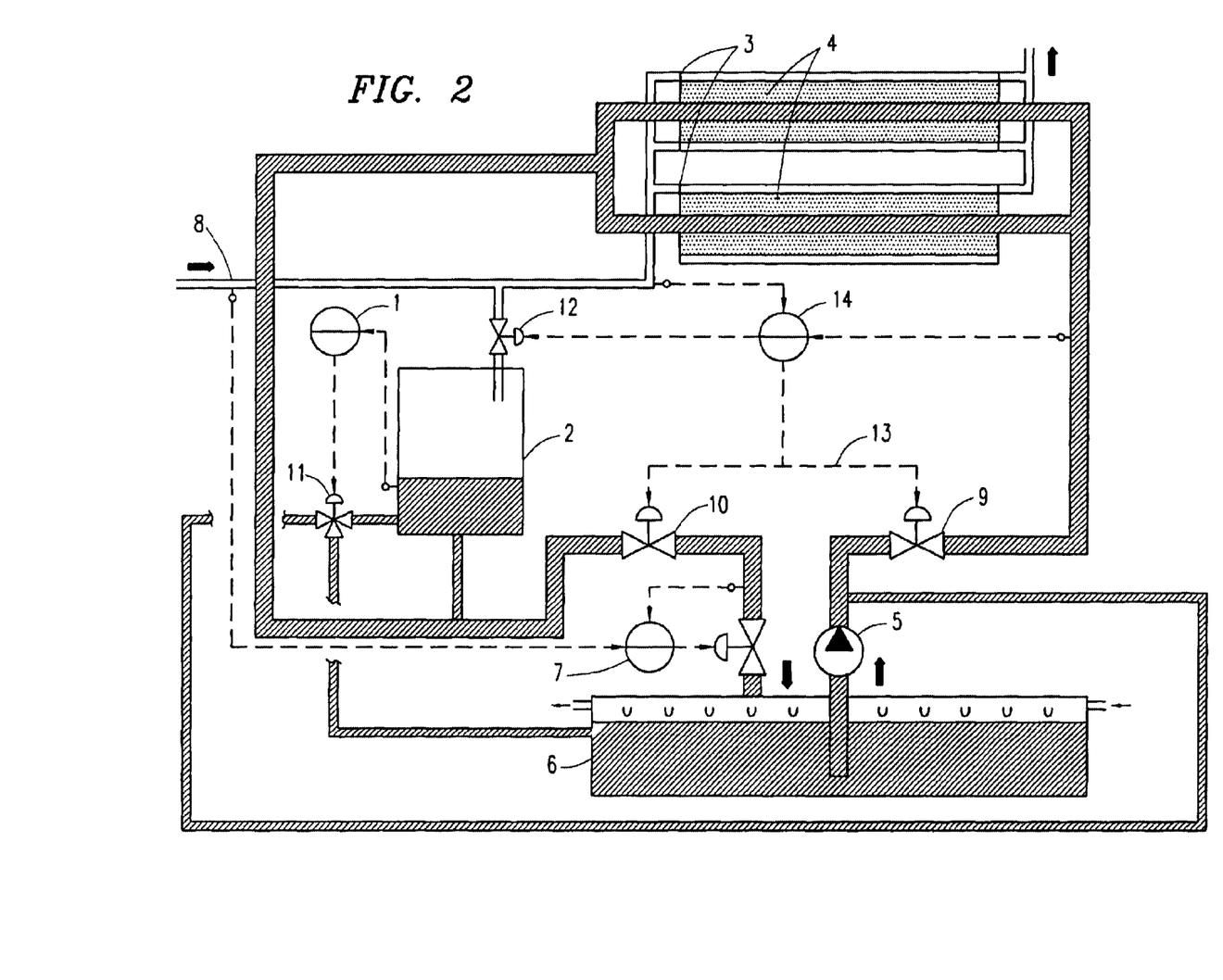
FIG. 2 is a schematic view of a trans-membrane pressure regulator for a membrane contactor where the safety arrangement according to the invention is incorporated.

The mode of operation of the system according to the invention will be explained in what follows, with reference to FIG. 2. As shown in FIG. 2, the size of the buffer tank 2 has been reduced substantially. The protection system is activated upon the pressure difference between the gas and the liquid approaching a level that may entail damage to the membrane, and is based on a system of valves that isolates the liquid carrying channel through the membrane housing from the remaining circuit, subsequently to balance the pressures of the isolated liquid volume and the gas.

During normal operation, a level control valve 11 will ensure that the amount of liquid in this tank is kept at a predetermined level. The pressure difference between the liquid in the buffer tank 2 and the gas is monitored by a mechanical pressure sensing valve 14. This reacts immediately upon this pressure difference exceeding a predetermined value, and will generate a pressure pulse in the activation line 13 that will effect extremely rapid closing of the two shut-off valves 9, 10. This isolates the liquid in between the shut-off valves, downstream of shut-off valve 9. The membranes are located in the isolated part of the circuit, and consequently it will be a simple task to prevent pressure differences that may damage the membranes 4. Maximum pressure difference is determined by a pressure equalising valve 12, which is provided between the gas pipe and the top part of the buffer tank 2. The opening pressure for the pressure equalising valve 12 is set higher than that which is required for the pressure sensing valve 14 to be activated, but is to be set sufficiently low for the membranes 4 not to be damaged. The pressure equalising valve 12 may alternatively be designed to provide a completely open connection between the gas and the buffer tank 2, upon actuation by the pressure sensing valve 14. This may further reduce the stress on the membranes 4. In the time from the opening of the pressure equalising valve 12 to the complete closure of the shut-off valves 9, 10, the pressure difference will cause liquid to be forced into or out of the buffer tank 2. In a relevant embodiment, it will typically take roughly 1/10 second from the reaction of the pressure sensing valve until the complete closure of the shut-off valves 9, 10. It is not desirable that the buffer tank becomes completely filled or emptied. The buffer volume must therefore be adjusted according to the reaction time of the protection system and the flowrate of the liquid. Typical volume of the buffer tank may be 8–10 liters.

Figure 3:
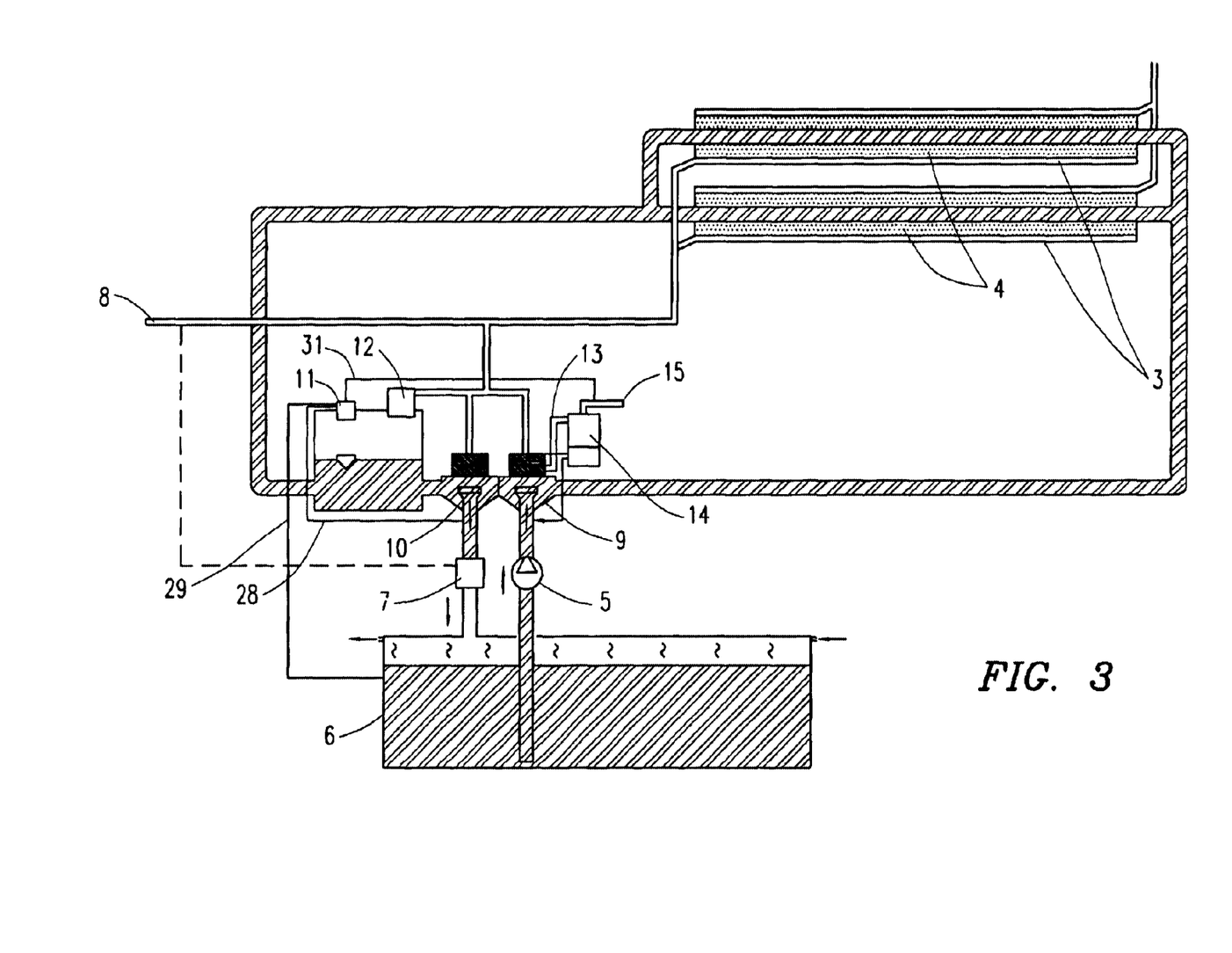
FIG. 3 is a schematic view of the trans-membrane pressure regulator for a membrane contactor where one embodiment of the safety arrangement according to the invention is incorporated.

In a preferred embodiment, shown in FIG. 3, the protection system is based upon the shut-off valves 9, 10 being activated by the pressure sensing valve 14 causing a rapid pressure drop in chambers that during normal operation are kept pressurised by being connected with the gas side through narrow channels. The pressure sensing valve 14 is designed to allow the pressure in these chambers to rise again once the pump pressure equals the pressure of the gas. The shut-off valves 9, 10 will then slowly open in order to bring the plant back into operation.

Figure 4:
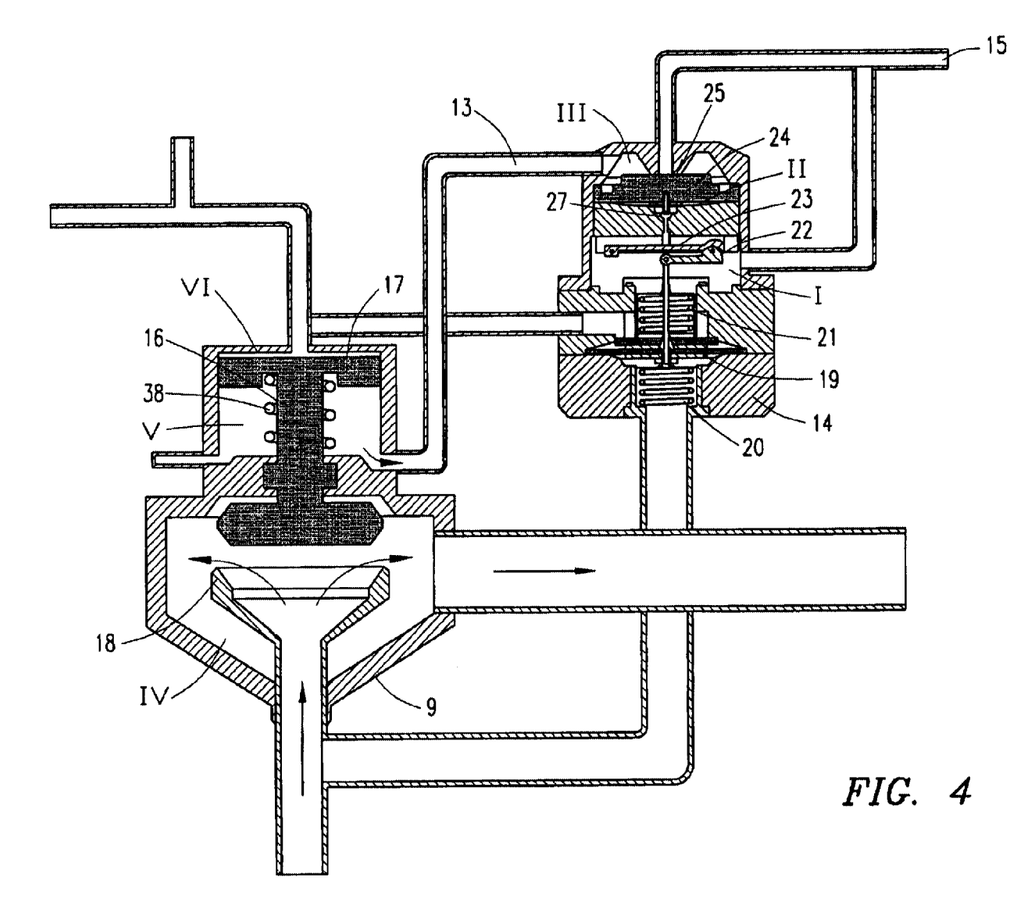
FIGS. 4, 5A and 5B are schematic views of the pressure sensing valve and one of the shut-off valves shown in FIGS. 2 and 3.
Figures 5A, 5B:
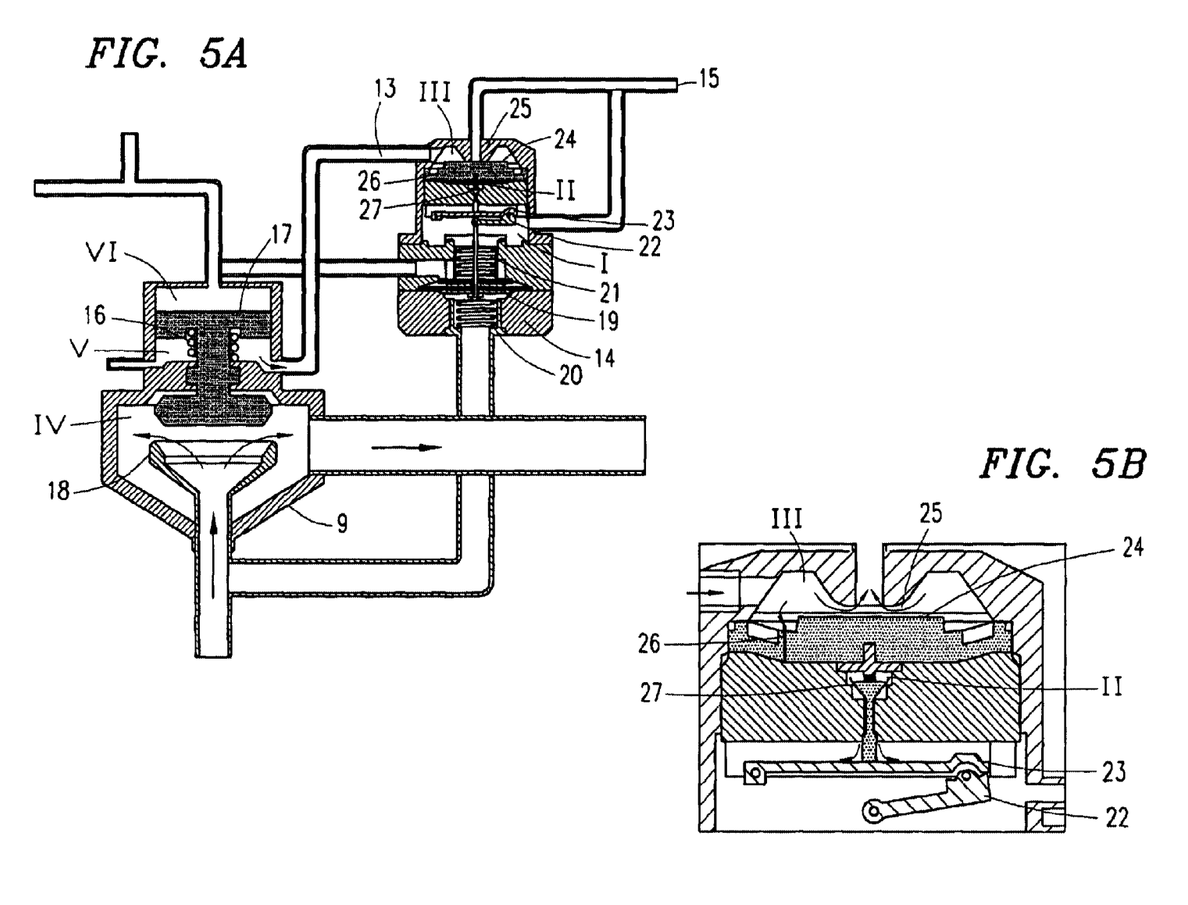

FIGS. 4, 5A and 5B shows a preferred embodiment of the pressure sensing valve 14 with a connection to one of the shut-off valves 9, 10. FIG. 4 indicates the operation during normal operation. FIG. 5A indicates the operation immediately after the closure of the shut-off valve, but before the chambers III and V have been depressurised down to minimum pressure. FIG. 5B shows parts of the pressure sensing valve 14 in a larger scale.

During normal operation, the valve body 16 of one of the shut-off valves 9, 10 is kept in open position by the spring 38. In this situation, the liquid pressure in chamber IV is approximately identical to the gas pressure in the chambers V and VI, and the pressure forces affecting the valve body 16 are balanced. Chamber V is pressurised through a narrow channel 17 into chamber VI, which is openly connected to the gas side. If a servo valve 24–27 in the pressure sensing valve 14 is activated, the pressure in chamber V will drop rapidly. The shut-off valves will start to close when the pressure in chamber V reaches 95% of the gas pressure. The servo valve 24–27 is controlled by the movement of the sensing diaphragm 19, through the levers 22, 23. The sensing diaphragm 19 is in turn affected by two biased springs 20, 21 to remain in the central position, but will be forced away from this position in the event of the pressure difference between the liquid and the gas exceeding a predetermined valve. The shut-off valves 9, 10 initiate closure only milliseconds after the sensing diaphragm 19 starts to move away from the central position.

In said servo valve 24, 27, a relatively rigid membrane 24 forms a partition between a lower chamber II and an upper chamber III. These chambers are connected through a narrow channel 26, preferably fitted in the membrane 24. During normal operation, when the chambers II and III have approximately the same pressure (see FIG. 4), the membrane 24 will be forced against the valve seat 25. If the sensing diaphragm 19 is shifted away from its central position, the levers 22, 23 make the valve body 27 being forced upwards and open for depressurisation of chamber II through chamber I to the exhaust channel 15. In turn, this will cause the pressure chamber III to force the membrane 24 out from the valve seat 25 as shown in FIG. 5B, and chamber V will be depressurised through activation line 13, chamber III and the exhaust channel 15. The stream from exhaust channel 15 is typically routed to the surrounding atmosphere or a flash tank.

In order to achieve a short closing time for the shut-off valves 9,10, the cross section of the valve seat 18 is selected to be larger than the effective flow area in the liquid circuit, typically in the range 2 to 5 times larger than the effective flow area. The shut-off valves may thus be switched from open to shut position with only a small movement of the valve body 16.

In a preferred embodiment, the buffer tank 2 includes a valve arrangement 11, designed to maintain a stable liquid level in the buffer tank 2. This valve arrangement 11 will compensate for too low liquid level by dumping gas from the buffer tank to the exhaust channel 15 through a channel 31.

This allows liquid to be supplied through the line 28, which has an open connection to the liquid circuit in the area between the pump and the shut-off valve 9. The liquid channel 28 is provided with a check valve (not shown) in order to prevent the buffer tank 2 from being drained of liquid when said area is at a lower pressure than the buffer tank 2. A floating body 30 co-operates with the valve arrangement 11 in closing the liquid channel 28 when the buffer tank 2 has reached the correct liquid level.

Figure 6A:
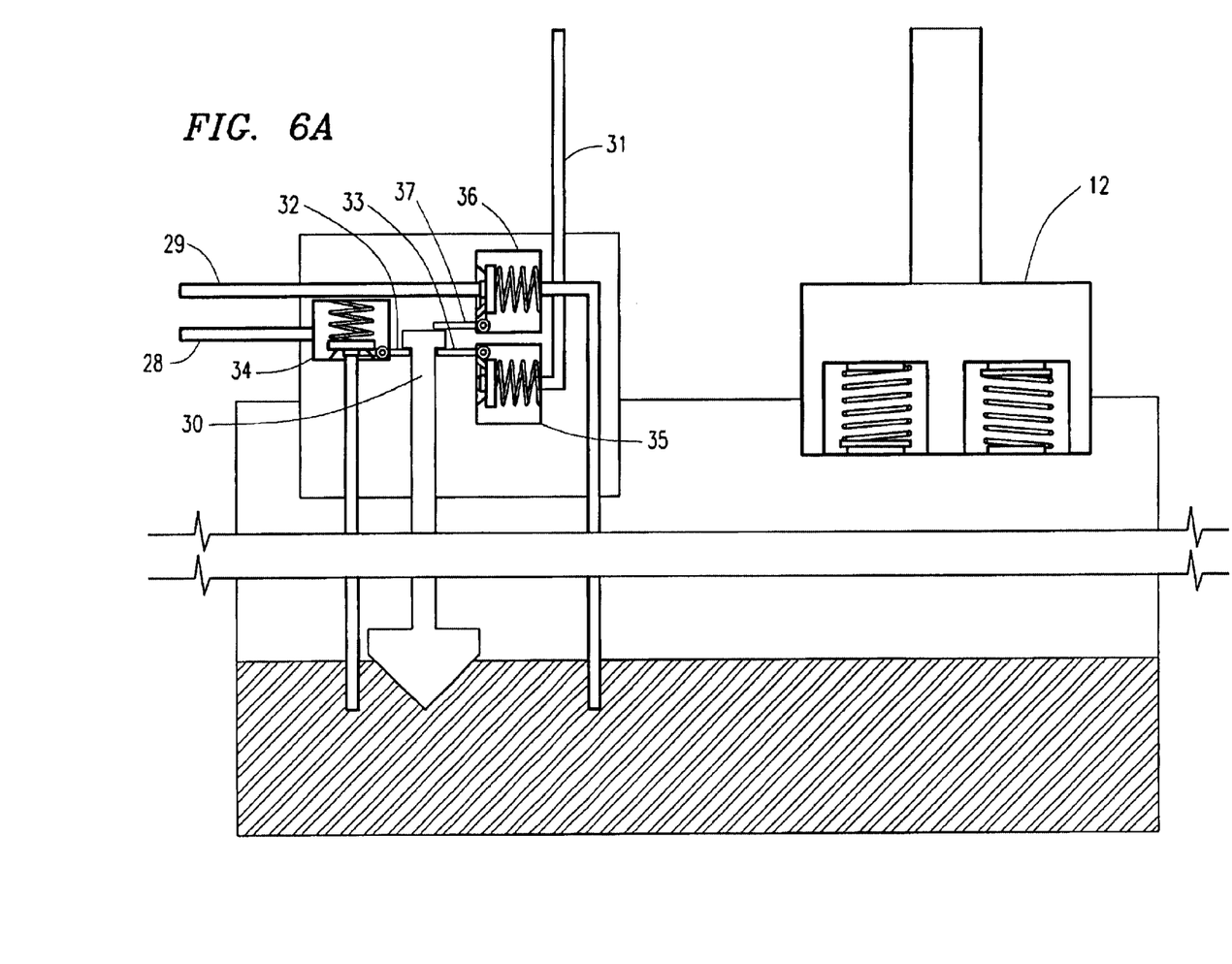
FIGS. 6A and 6B are schematic views of the pressure equalising valve and level control valve shown in FIGS. 2 and 3.
Figure 6B:
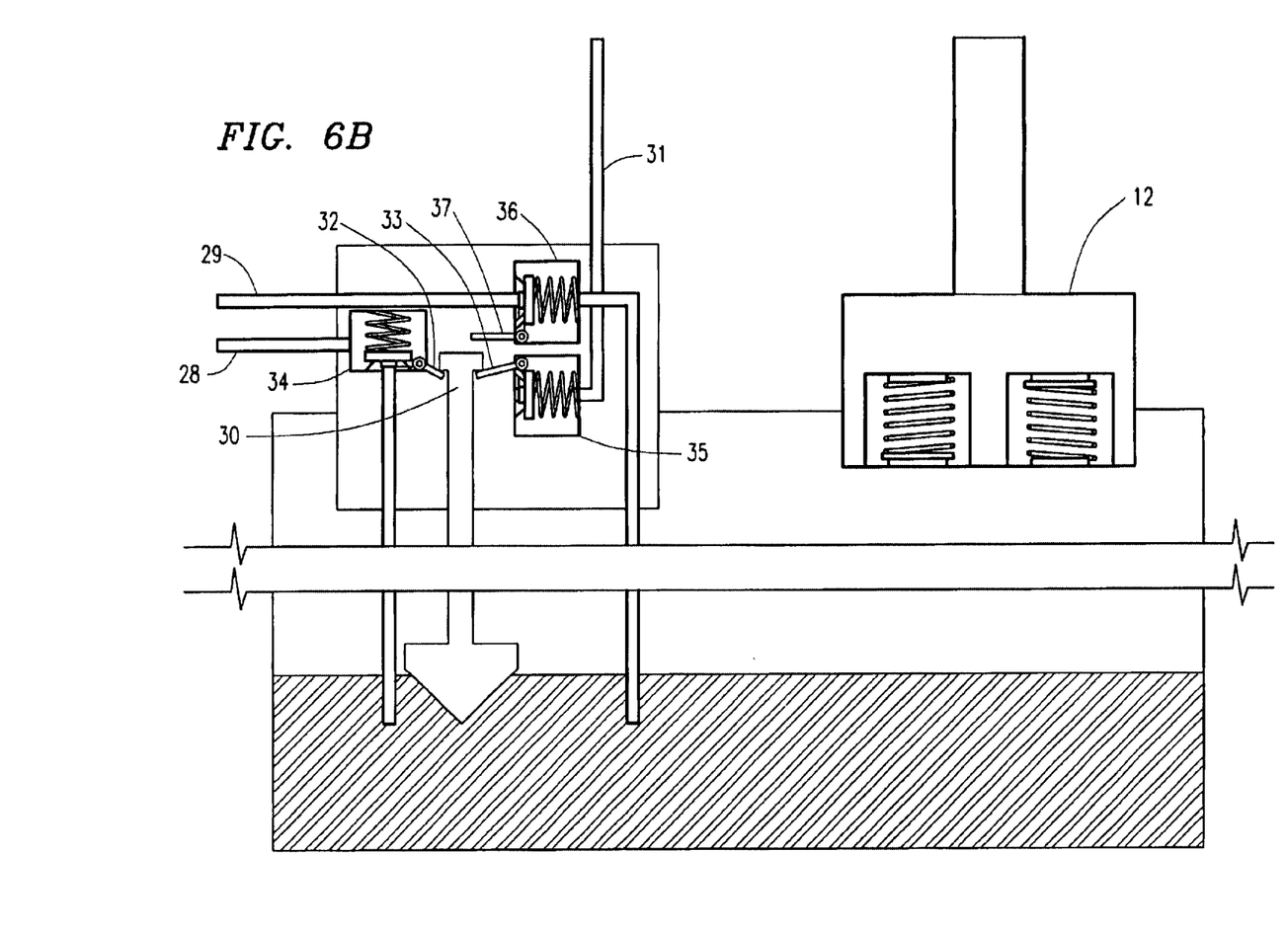

When the liquid level is too high, the valve arrangement 11 will open a liquid channel 29 which allows liquid to be dumped to reservoir 6. The principles of these operations are shown in FIGS. 6A and 6B.

The valve arrangement 11 consists of 3 separate tilt valves. The housing 34, 35, 36 for the tilt valves that control the volume of liquid in the buffer tank 2 have a leak proof penetration of their control levers 32,33,37. FIG. 6A indicate the position of the tilt valves when the liquid level is correct. FIG. 6B indicates the position of the tilt valves when the liquid level is too low. The floating body 30 co-operates with a valve that is provided in a channel between the activation line 13 and the exhaust channel 15. This function prevents pressure from building up in the activation line 13 in the event of incorrect liquid level in the buffer tank 2, and ensures that the system may not be put into operation without the emergency system being fully operative. The function is not indicated in the figures. FIGS. 6A and 6B also indicate the functioning of the pressure equalising valve 12. This consists in principle of two spring loaded check valves with close to identical opening pressures, but with opposite directions of flow.

The protection system according to present invention can in principle be used for any type of system involving a membrane contactor or similar over any range of operating pressure. These systems can include systems for natural gas sweetening (removal of $CO_2$, $H_2S$ and other sour gas components), natural gas dehydration (removal of $H_2O$), deoxygenation of seawater by means of gas stripping and similar.

The valves can be operated e.g. hydraulically, pneumatically, mechanically etc.

Depending on the application the gas can either be directed along the exterior face of the membrane or along the inside.

What is claimed is:

1. A protection system arranged to prevent a large transmembrane pressure difference over a pressure sensitive membrane fitted in a pressure resistant chamber having respective inlet and outlet lines for a gas and a liquid, where the membrane forms a physical barrier between a liquid and a gas once a liquid and a gas mixture are carried through the chamber, characterized in that the protection system comprises:
    (a) two shut-off valves provided in the liquid inlet and liquid outlet lines respectively,
    (b) a buffer tank provided in the line between one of the shut-off valves and the pressure resistant chamber,
    (c) a pressure equalizing valve provided in flow communication between the gas inlet line and the buffer tank, and
    (d) a pressure sensing valve for measuring the pressure difference over the membrane and which activates the shut-off valves once this pressure difference exceeds a predetermined value.

2. The protection system according to claim 1, characterized in that the shut-off valves comprise respective valve seats and valve bodies, wherein the cross section of each valve seat is 2 to 5 times larger than the effective flow area to give the valve bodies a short travel distance from an open to a closed position.

3. The protection system according to claim 1, characterized in that the buffer tank is arranged to maintain a stable liquid level and that the buffer tank comprises a floating body that co-operates with a valve arrangement, which, when the liquid level in the buffer tank is too low, opens a channel for venting of gas from the buffer tank, and also opens to a channel for topping up to the stable liquid level, and which, when the liquid level is too high, opens a channel for dumping of liquid to a reservoir at a lower pressure.

4. The protection system according to claim 1, characterized in that the shut-off valves have a response time from a fully open to a fully closed position of less than 1 second.

* * * * *

UNITED STATES PATENT AND TRADEMARK OFFICE
CERTIFICATE OF CORRECTION

PATENT NO. : 6,649,047 B1
DATED : November 18, 2003
INVENTOR(S) : Nils T. Ottestad It is certified that error appears in the above-identified patent and that said Letters Patent is hereby corrected as shown below:

Column 1,
Line 35, replace "differences at low as" with -- differences as low as --

Signed and Sealed this

Twenty-first Day of September, 2004

JON W. DUDAS
*Director of the United States Patent and Trademark Office*